Sept. 13, 1938.  M. BURLIN  2,130,262
PORTABLE CAMERA SUPPORT
Filed April 6, 1938
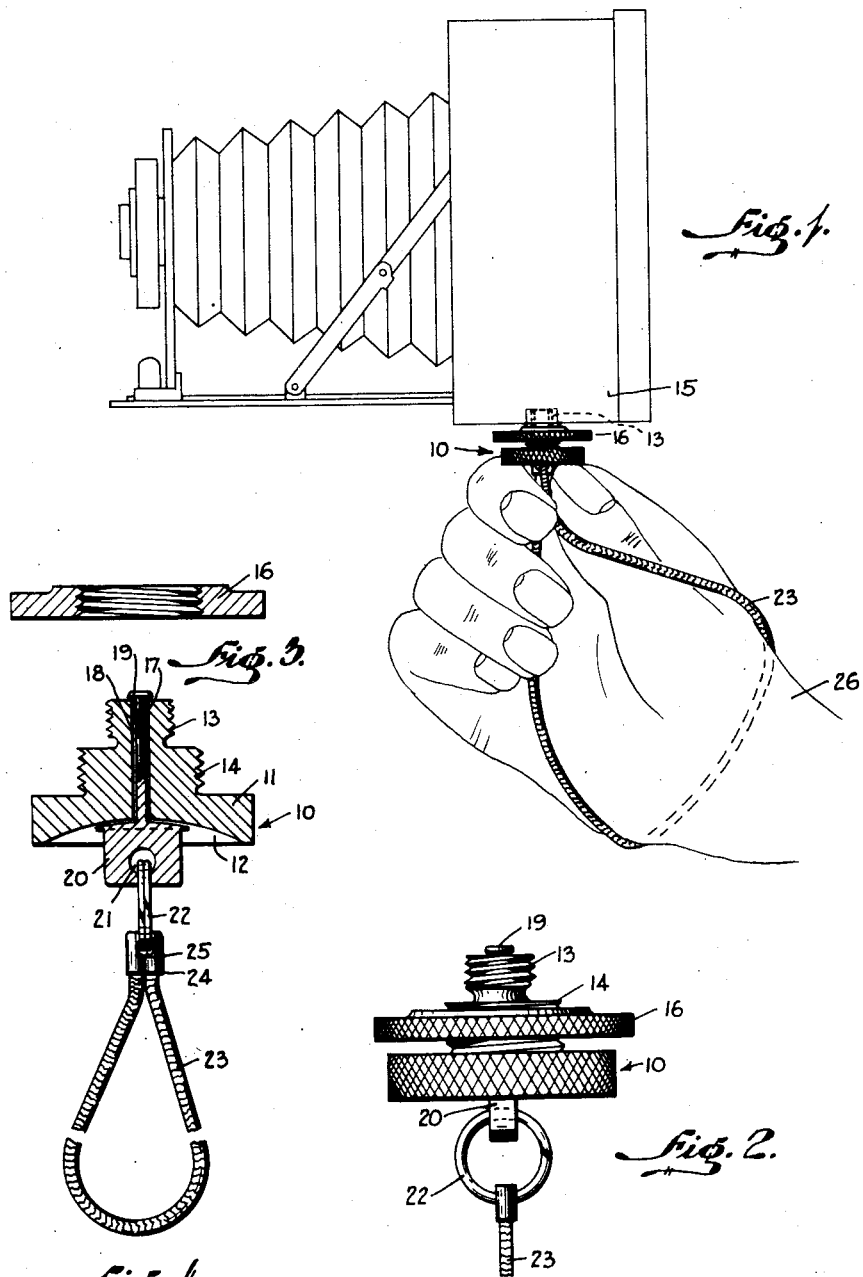
INVENTOR.
Moritz Burlin.
BY Maxwell E. Sparrow
ATTORNEY.

Patented Sept. 13, 1938

2,130,262

UNITED STATES PATENT OFFICE 2,130,262

PORTABLE CAMERA SUPPORT

Moritz Burlin, New York, N. Y., assignor to Emby Photo and Film Machine Corp., New York, N. Y., a corporation of New York Application April 6, 1938, Serial No. 200,452

10 Claims. (Cl. 95—86)

This invention relates to improvements in portable camera supports and has as an object the provision of such device which is very practical, efficient, economical, easy to handle and comprises a few parts only.

It is a further object of the present invention to provide a portable camera support which facilitates the camera being suspended from or carried by a hand only.

It is still a further object of the invention to provide a portable camera support in which the base thereof comprises three integrally united successively reduced cylindrical portions, namely two end portions and an intermediate portion, one of the end portions being threaded for engagement with the camera housing and the intermediate portion being threaded for engagement with a lock nut to be moved against said camera housing for relatively securing the housing and the said base.

Still a further object of the present invention resides in providing a freely rotatable member substantially housed in the aforementioned base.

Still another object of the present invention contemplates the provision of a flexible handle articulatedly connected to said rotatable member thereby permitting the handle to freely swivel.

Further objects of the present invention reside in the provision of means for enabling the device to be firmly held by a thumb and finger of the hand for supporting the camera in any desired operative position and to further provide a flexible looped handle for association and cooperation with said means to additionally facilitate the camera being placed in said operative position whereby the hand is made to replace the conventional tripod or camera stand.

This invention accordingly consists in the features of construction, combination of parts and in the unique relations of the members and in the relative proportioning and disposition thereof, all as more completely outlined herein.

To enable others skilled in the art so fully to comprehend the underlying features thereof that they may embody the same by the numerous modifications in structure and relation contemplated by this invention, a drawing depicting a preferred form of the invention has been annexed as a part of this disclosure, and in such drawing, like characters of reference denote corresponding parts throughout all the views, of which:

Fig. 1 is a perspective view of an embodiment of the invention showing its application to a camera.

Fig. 2 is a side elevational view of the same, the greater portion of the handle being omitted.

Fig. 3 is a sectional view of the lock nut and

Fig. 4 a partial sectional view of the remaining portion of the device, the flexible handle being partially broken away.

Referring to the drawing which shows by way of example a preferred embodiment of the invention, there is disclosed a base 10 comprising three integrally united portions arranged in stepped relation. The lower end portion 11 may be provided with a recess 12 for a purpose hereinafter described. The reduced end portion 13 and the intermediate portion 14 are threaded. Portion 13 is adapted for screw threaded engagement with the camera housing 15. Intermediate portion 14 is capable of threaded engagement with a lock nut or similar member 16. Base 10 is perforated through its center as indicated at 17 through which passes a shank or pin 18 but of smaller diameter so as to freely rotate therein. The free end of shank 18 is upset at 19 whereas its opposite enlarged end or head 20 forms a rotatable abutment within the recess 12. Head 20 has an aperture 21 for loose engagement of a spring ring 22 therewith. Handle 23 of flexible structure has a tip 24 which is also provided with an aperture 25 to permit loose engagement of ring 22 therewith.

The base 10 is attached to the camera housing by causing threaded engagement of reduced portion 13 with the camera housing 15 and this attachment is made lockingly secured by tightening up on the nut 16 in a direction towards the housing 15. Fig. 1 shows the device in operable position, the handle 23 being looped about the hand 26 and the thumb and forefinger of the hand gripping head 20 and abutting base 10 within its recess 12.

It can be seen that the head 20 and recess 12 and flexible looped handle 23 cooperate in such manner that the camera may be supported only by hand of the operator and takes the place of the conventional tripod or camera stand.

The flexible handle or cord 23 permits the camera being swung and suspended from the handle in a nonchalance manner, and enables the cameraman to quickly and steadily place the camera in any desired operative position. Threaded member 16 and base portion 11 may be suitably knurled or ridged to provide a secure grip.

From the foregoing description, taken in connection with the accompanying drawing, the advantage of the construction and operation of the device shown will be readily understood by those skilled in the art to which the invention pertains; and while I have described the principle of operation, together with the device which I now consider to be the best embodiment thereof, I desire to have it understood that the device shown is merely illustrative and that such changes may be made as are within the scope of the appended claims.

I claim:

1. A portable camera support comprising a base, a handle, means swivelly connecting said handle to said base, and a threaded member, said base having threaded portions of different diameters, one of said portions for engagement with said camera and the other of said portions engaging said threaded member for lockingly securing said base to said camera.

2. A portable camera support comprising a base, a flexible looped handle, means swivelly connecting said handle to said base, and a threaded member, said base having threaded portions of different diameters, one of said portions for engagement with said camera and the other of said portions engaging said threaded member for lockingly securing said base to said camera, said handle adapted to permit the camera when attached to said base to be swung in any desired operative position from a hand of the operator.

3. A portable camera support comprising a base, a handle, means swivelly connecting said handle to said base, and a threaded member, said base having threaded portions of different diameters, one of said portions for engagement with said camera and the other of said portions engaging said threaded member for lockingly securing said base to said camera, said means including a member having a head portion and a shank portion rotatively engaging with said base.

4. A portable camera support comprising a base, a handle, means swivelly connecting said handle to said base, and a threaded member, said base having threaded portions of different diameters, one of said portions for engagement with said camera and the other of said portions engaging said threaded member for lockingly securing said base to said camera, said means including a member having a head portion and a shank portion rotatively engaging with said base, said handle adapted to permit the camera when attached to said base to be swung in any desired operative position from a hand of the operator.

5. A portable camera support comprising a base, a handle, means swivelly connecting said handle to said base, and a threaded member, said base having threaded portions of different diameters, one of said portions for engagement with said camera and the other of said portions engaging said threaded member for lockingly securing said base to said camera, said means including a member having a head portion and a shank portion rotatively engaging with said base, said base having a recess adjacent said head portion for engagement of the thumb and a finger of a hand for facilitating support of said camera relatively to said hand.

6. A portable camera support comprising a base, a handle, means swivelly connecting said handle to said base, and a threaded member, said base having threaded portions of different diameters, one of said portions engaging said threaded member for lockingly securing said base to said camera, said means including a member having a head portion and a shank portion rotatively engaging with said base, said base having a recess for cooperating with said head to permit engagement of the thumb and a finger of a hand with said head and base for supporting said camera relatively to said hand and in an operative position.

7. A portable camera support comprising a base, a hand engaging member, and means swingably connecting said member to said base, said base having a threaded portion for engagement with said camera, said means including an element rotatably engaging with said base, said element and said member cooperating when engaged by the hand to substantially firmly permit support of said camera.

8. A portable camera support comprising a base, a hand engaging member, and means connecting said member to said base, said base having a threaded portion for engagement with said camera, said means including an element engaging with said base, said element and said member cooperating when engaged by the hand to substantially firmly permit support of said camera.

9. A portable camera support comprising a base, a hand engaging member to said base, said base having a portion for engagement with said camera, said member including a part extending from said base, said base provided with a recess adjacent said part, said part being adapted to be gripped by, and said recess for accommodating the thumb and finger of the hand, when the latter is in engagement with said member.

10. A portable camera support comprising a base, and flexible means, said base adapted for detachably receiving said camera thereon, said flexible means connected with said base and for cooperating with said base through a hand of the operator for adjustment of said camera with respect to any desired operative position thereof.

MONTEE DURKIN.